April 26, 1960   F. E. COLLETTE   2,934,349
DISPENSING CART FOR CLOTHING AND THE LIKE
Filed March 14, 1958
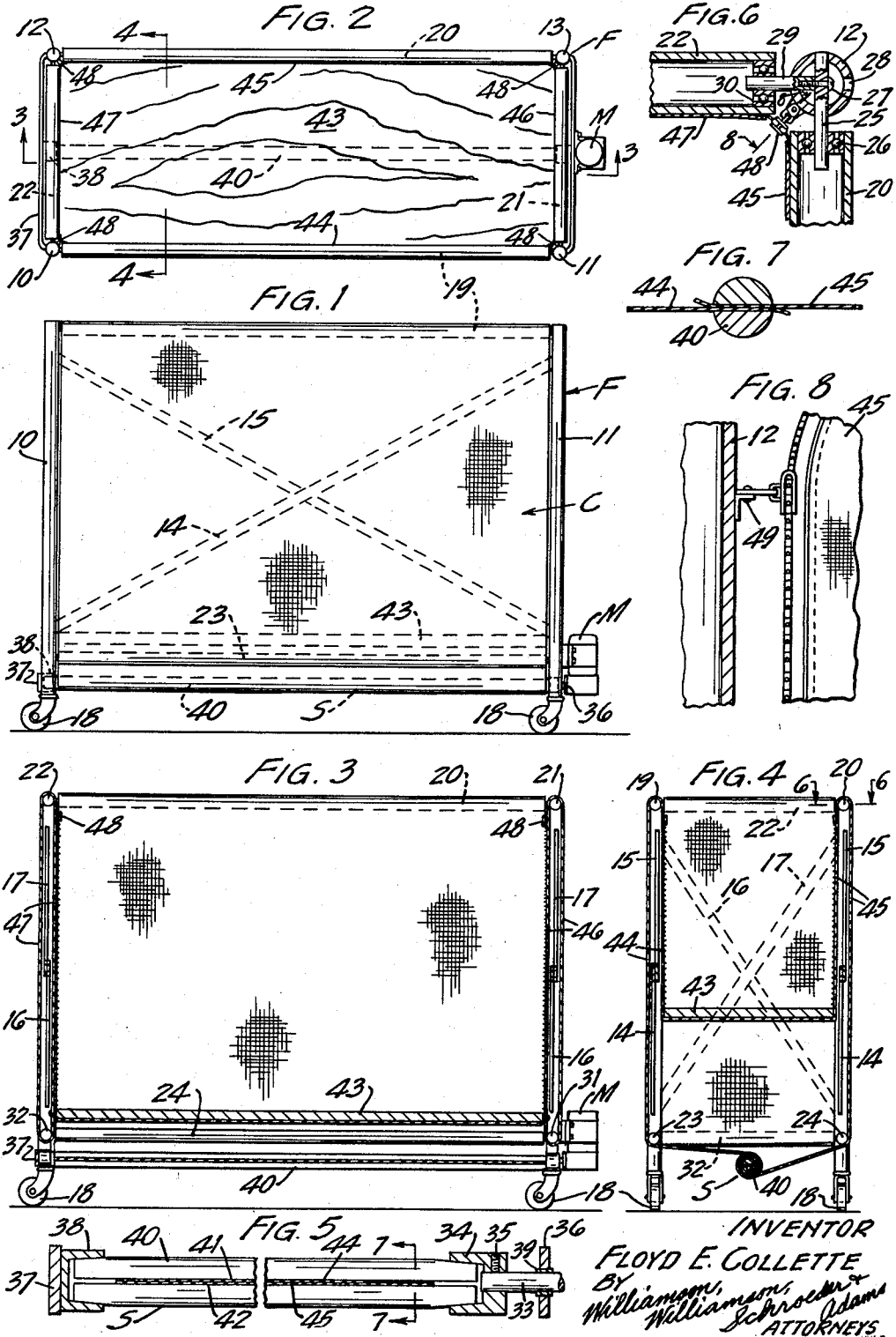
INVENTOR
FLOYD E. COLLETTE
BY Williamson, Williamson, Schroeder & Adams
ATTORNEYS

United States Patent Office 2,934,349
Patented Apr. 26, 1960

2,934,349
DISPENSING CART FOR CLOTHING AND THE LIKE

Floyd E. Collette, Farmington, Minn.

Application March 14, 1958, Serial No. 722,116

5 Claims. (Cl. 280—34)

This invention relates to a cart, and more particularly to a cart designed to transport such articles as soiled clothing from one location to another and for the convenient and efficient dispensing of the articles therefrom.

There are numerous cart devices which have been proposed for carrying a variety of articles from one place to another, then maintaining the articles in readiness for manual removal therefrom. Where the articles are nested or stacked in geometrical relation, lifting platforms can be employed so as to maintain the level of the articles approximately constant as they are positioned on the apparatus or removed therefrom by manual means. The constant level facilitates removal of the articles without the necessity of the operator bending and reaching more and more as the articles in the cart or on the cart platform become depleted. Where such articles are of different shapes and sizes or are in the form of soft goods which cannot be stacked or symmetrically piled on a lifting platform, there has been no satisfactory solution to the problem of elevating the articles within the cart as they are individually withdrawn so as to contain them against lateral displacement and spilling while, at the same time, maintaining the level of the remainder of the articles at, or near, the top level of the cart for convenient handling of the articles.

A particular problem is posed in connection with small or shapeless articles which tend to shift sideways in a mass and particularly in the case of soiled clothing which presents a soft and tangled mass which is difficult to manage in a container such as that of a transportation cart employed in dry cleaning establishments. Thus, in the case of such carts employed in the dry cleaning trade, the soiled clothes are normally put into the cart and then are transported to the table of the "spotter" who, in turn, picks up consecutively the uppermost garment and then lays it upon the table, after which he inspects it for soiled spots and sprays over each spot a solvent selected for the particular qualities and properties of the soiled spot. After having pretreated the article of clothing in this manner, it is then thrown in another pile awaiting cleaning in the regular dry cleaning solution and by means of the conventional steps of dry cleaning. Now, as the pile diminishes within the conventional cart, the "spotter" must reach more deeply into the cart container. Except for the first few articles of clothing in the cart when it is filled to the top, the "spotter" cannot accomplish his spotting operation upon the garments as they lie within the container of the cart. Nothing is gained where the entire container is raised since the "spotter" still must reach up and over the edges of the cart.

The present invention makes it possible for an operator to work on, otherwise handle, or care for soft or loose articles which have been transported within a cart without the separate step of transferring them, individually or collectively, to a new position such as on a table. In other words, the operator can work directly upon the uppermost articles in the cart container and remove them after having accomplished his purpose, new articles being raised to the same uppermost level as he proceeds until the entire contents of the cart have been worked upon.

It is, thus, an important object of this invention to provide for a cart structure such as will hold shiftable articles in retained position while feeding them upwardly for handling at a predetermined working level and for consecutively removing the uppermost articles from said predetermined level until all have been exhausted from the cart.

It is another object of the invention to provide for an apparatus which can function both as a transporting cart and as a feeding table while preserving articles contained therein against shifting or tangling with the operating mechanism.

It is a further object of the invention to provide a device of the class described having a mechanism which will move upwardly and simultaneously the sides of a flexible container with the edges thereof in secured relation below the top of the cart and in separated relation at the top and outer edges.

It is a still further object of the invention to provide for a novel and efficient cart structure which will, in effect, provide for a flexible container enclosed at all sides for retaining shiftable articles, yet separating the sides of the flexible container while moving the articles upwardly to preserve a constant working level at the top of the container, there being no portion of the cart which will, at any time, interfere with the operator's handling and working upon the uppermost articles therein.

These and other objects and advantages of the invention will more fully appear from the following description, made in connection with the accompanying drawings, wherein like reference characters refer to similar parts throughout the several views and in which:

Figure 1 is a side elevation of my cart structure, certain hidden bracing structure being shown in dotted line;

Figure 2 is a top plan view of my cart showing the spool mechanism in dotted line position;

Figure 3 is a vertical section of the cart structure shown in Figures 1 and 2, being taken on the lines 3—3 thereof and the container bottom being shown in its lowermost position;

Figure 4 is a vertical section of the cart structure shown in Figures 1 and 2, the section being taken on the lines 4—4 of Figure 2, and the container bottom having been elevated to an intermediate position;

Figure 5 is an enlarged broken detail of the spool mechanism, the bearing, coupling and bracking structure being shown in section and cut away from the remainder of the structure;

Figure 6 is an enlarged segmental view of the roller assembly at the upper corner of my cart taken on the lines 6—6 of Figure 4;

Figure 7 is a segmental cross sectional view of the spool mechanism and a segment of container sheet material disposed therewithin, the spool being in unwound condition; and Figure 8 is an enlarged detail of the closure means for closing and separating the edges of the container sides, portions thereof being shown in section and portions of the structure unessential to the closure mechanism being cut away.

Referring now more particularly to the drawing, my cart apparatus comprises a generally rectangular frame structure F which, in turn, consists of corner members 10, 11, 12 and 13, as shown in Figure 2. The corner members have upright portions terminating substantially at the same horizontal level at the upper portion of the frame structure F and, likewise, have lower corner members comprising a generally rectangular form and disposed directly beneath each of the corresponding upper corner members. For the sake of convenience and strength, I use a single upright tubular member for rigidly connecting the upper corner structure with the lower corner structure. For lateral bracing, I use ordinary cross braces such as 14 and 15, shown in Figure 1 at each side of the rectangular frame structure, a similar pair of braces 14 and 15 rigidly maintaining the corner uprights 12 and 13 in spaced relation. Braces 16 and 17 interconnect the corner uprights 11 and 13, as well as corner uprights 10 and 12, as shown in Figure 4. Caster or roller elements 18 may be rotatably mounted at the bottom of each of the corner uprights 10, 11, 12 and 13.

Elongated sheet-engaging members such as the horizontal rollers 19 and 20 are rotatably journaled respectively between the upper portions of uprights 10 and 11 and corner uprights 12 and 13. In a similar manner, elongated sheet-engaging members such as horizontal rollers 21 and 22 are rotatably journaled respectively between the upper portions of uprights 11 and 13 and between uprights 10 and 12, as shown in Figure 2. Corresponding lower sheet-engaging members such as horizontal rollers 23 and 24 are rotatably journaled in a lower position between the corresponding uprights 10 and 11, as shown in Figure 1, at a side portion of the cart frame F and across the uprights 12 and 13 respectively, as shown in Figure 3. All of the horizontal roller elements are freely rotatable and are disposed in spaced parallel relation, as shown. It is understood that the horizontal roller members could be rendered non-rotatable for merely allowing sliding engagement of sheet material thereof, but it is preferred to reduce the frictional drag by employing freely rotating horizontal rollers, as previously described. Details of the roller mounting upon the corner upright 12 is shown in Figure 6. The enlarged horizontal section is taken at the plane of intersection of the bearing mounts to the corner upright 12. A bolt or shaft 25 is placed laterally through opposed openings in the corner uprights 12, as shown, and is welded therein to extend rigidly in a horizontal direction, and the roller bearing 26 is mounted thereon so as to form a bearing mount for the roller member 20 as shown. The shaft 25 has an opening through which screw 27 passes laterally and at right angles to the axis of shaft 25, the hole 28 being aligned therewith for introducing screw 27.

Another shorter bolt or shaft 29 has a tapped opening for cooperating with the screw 27 and extends at right angles to the axis of the corner upright 12 as well as at right angles to the shaft 25. The shaft 29 has roller bearings 30 mounted thereon to form a bearing mount for the upper roller member 22. It is understood that each of the corner members 10, 11, 12 and 13 has a similar bearing assembly, both at the upper position and at the lower position so that the side roller members 19 and 20 may be mounted at an upper portion of the frame F and the side roller members 23 and 24 may be mounted directly beneath the first named respective rollers and at a lower portion of the frame structure F. Likewise, the end horizontal rollers 21 and 22 are mounted between the corresponding bearing assemblies between corner uprights 11 and 13, as well as uprights 10 and 12, as shown in Figure 2. Directly beneath and in spaced parallel relation, the lower and horizontal rollers 31 and 32 are similarly journaled. The framework F thus comprises a rectangular open-topped, box-like structure with horizontal roller members mounted at all of the uppermost edges as well as adjacent the lowermost edges of the frame structure.

Also mounted on the frame structure at a lower position is a raising and lowering means which comprises, in turn, a driving means such as motor M which is in geared-down driving connection with a spool mechanism S, as shown in Figures 1 and 5. A driving connection is established between the motor M and the spool mechanism S through shaft 33 to which a coupling 34 is attached by such means as set screw 35. The shaft 33 may pass through, or be journaled in, a brace 36 which is secured rigidly across the lower ends of the upright corner members 11 and 13. Another brace 37 is rigidly attached across the lower part of upright corners 10 and 12, as shown in Figure 3, and a bearing member 38 is rigidly secured thereto at a medial position which is in alignment with the opening or bearing 39 in the brace 36. An elongated spool 40 extends across the bearing 38 to the aligned coupling 34, the spool being rigidly held by the coupling 34 for rotation with the shaft 33. The spool 40 may comprise elongated half-round members having opposed faces 41 and 42 which will lie in clamping engagement when the spool 40 is mounted between coupling 34 and the bearing 38. Details of the operation and purpose of spool 40 will be described below.

The cart container which is disposed within the frame structure F comprises a bottom 43, as shown in Figures 2, 3 and 4, which is preferably rigidly constructed of such material as wood or metal. The walls of the cart container comprise flexible side panels or sheets 44 and 45 at the opposed sides as shown in Figure 2, and the flexible end panels 46 and 47 as shown in the same figure. The flexible side panels may be constructed of sheet material such as woven fabric which will be strong and durable while, at the same time, having flexibility for sliding or rolling over the elongated sheet-engaging members. Thus, the side panel sheet 44 comprises a rectangular member, the bottom edge of which is secured to the corresponding edge of the container bottom 43, the sheet extending upwardly and over the sheet-engaging member 19, then outwardly and reversely to connect with the spool 40 in clamping engagement therewithin, as shown in Figures 5 and 7. In a similar manner, the opposed flexible side panel 45 is fastened to the bottom member 43 and extends upwardly at the inside of the frame structure F, then passes over the top and outwardly of the sheet-engaging member 20, then extends reversely down the outside of frame structure F to also be secured within the clamping arrangement of the spool 40. In order to maintain the flexible side panels away from the framework at the sides and bottom, they pass over, then under, the respective bottom side roller members 23 and 24, as shown in Figures 1 and 4.

The end panels 46 and 47 are similarly formed with minor differences between them and the side flexible panels. In the case of the end panels, the sheet member 47 extends in a continuous loop from its point of connection with the bottom 43 upwardly, then outwardly over the sheet-engaging member 22, then downwardly over and inwardly of the sheet-engaging member 32 at the lower portion of the frame. The sheet then extends reversely to join with the bottom 43 to complete the endless belt arrangement. The end sheet 46 is similarly fastened in endless belt arrangement to the bottom 43 and passes over the respective upper and lower sheet-engaging members 21 and 31 at the opposite end of the cart.

Thus far described, the container provides separated wall members, the corners of which can gap and bulge. If articles are placed on the bottom 43 for transporting and dispensing, and are of such a nature and so positioned that they will not shift laterally to place strain upon the side and end panels, then no difficulty is encountered in raising and lowering the container bottom 43 to maintain a constant level of articles at the uppermost plane of the cart. Since, however, the present usage of my dispensing cart is for articles of such a class as will present lateral pressure and be shiftable in a haphazard mass, I have devised a container corner closure and separating means which will continually provide an enclosed container regardless of the position of the bottom 43. On the other hand, the panel extensions which pass over the upper horizontal rollers will always be separated exactly at the uppermost portion of the container regardless of the position of the bottom 43. In order to attain this corner closure, I provide a continuous closure such as a conventional "zipper" member which engages cooperating "zipper" fasteners disposed along the adjacent corner edges of the flexible panel members. Referring to Figures 2 and 6, the end panel 47 and side panel 45 are maintained in closed relation beneath the slide fastening element 48 which, in turn, is mounted upon the adjacent upright corner member 12, as shown in Figures 6 and 8, by means of a connecting bracket 49. A similar corner closure is secured adjacent the upper end of each of the corner uprights 13, 10 and 11.

In the use and operation of my dispensing cart, I first cause the power source such as motor M to be reversed by mechanism, not shown, so that the spool 40 will unwind and release the ends of side panels 44 and 45. The container bottom 43 will then drop to a lowermost position, as shown in Figure 3. Since the slide fastener members 48 are positioned near the uppermost part of each of the corner uprights, the entire cart container will have the sides thereof closed all the way from the top to the bottom. Articles such as clothing are then placed within the cart and may be transported to another location as, for example, to the "spotter's" position in a dry cleaning establishment. The "spotter" then selects articles of clothing at the top of the container and works thereon, using the rest of the pile of articles within the container as a sort of table at a constant predetermined level. As he removes each of the articles upon which he has finished working, the pile will begin to diminish and the surface thereof will be depressed somewhat into the cart container C. Motor or other power means M may then be caused to rotate the spool mechanism S so as to cause the spool 40 to rotate and wind the opposed flexible side panels 44 and 45 thereon. This winding action will raise the bottom 43 as each of the side panels passes over its opposed set of horizontal spaced rollers. At the same time, the side panels 46 and 47 will rise at the inside and be lowered at the outside so as to follow the movement of bottom 43 as it is raised. At the same time, the slide fastener elements 48 will continuously open the closure which extends down to the bottom 43 so as to separate the adjoining corners of the sheet panels and thereby enable each sheet to pass over its respective horizontal roller. It is understood that the operator, under ordinary circumstances, may need only to energize the motor M or other means, for but a few seconds at a time, so as to bring back the level of articles placed within the container structure C. After the articles have been exhausted from the container C, the motor M may then be reversed and the entire cycle repeated.

It will, of course, be understood that various changes may be made in the form, details, arrangements and proportions of the parts without departing from the scope of my invention as set forth in the appended claims.

What I claim is:

1. A cart for transporting and dispensing shiftable articles such as soiled clothing comprising, a generally rectangular frame structure having corner members positioned at the upper portion of the structure and extending downwardly in braced relation to a lower position in the structure, elongated sheet-engaging means interposed across adjacent upper rectangular corners, a cart container having a bottom and opposed flexible sheet panels secured to the sides thereof and extending upwardly in suspended relation and outwardly over opposed portions of said elongated sheet-engaging means at the upper part of said frame structure, said flexible sheet panels forming container walls within the frame structure, then extending downwardly from said opposed portions of the elongated sheet-engaging means, spool mechanism journaled at a lower position on said frame structure and windingly securing the ends of opposed flexible sheet panels and adapted to simultaneously retract and advance said panels to raise and lower said container.

2. A cart for transporting and dispensing shiftable articles such as soiled clothing comprising, a generally rectangular frame structure having corner members positioned at the upper portion of the structure and extending downwardly in braced relation to a lower position in the structure, horizontal roller members journaled across adjacent upper rectangular corners, a cart container having a bottom structure and opposed flexible side panels secured respectively at the sides thereof and extending upwardly in suspending relation, then outwardly over opposed portions of said horizontal rollers at the upper part of said frame structure, and flexible end panels secured respectively at the ends of said bottom structure and extending upwardly over opposed horizontal rollers at the upper portion of said frame structure, said flexible panels constituting the container walls within the frame structure and each of said panels extending over its respective horizontal roller, then passing downwardly and laterally over its corresponding lower horizontal roller, container corner closure and separating means comprising edge-mounted cooperating fasteners along each adjacent side edge and a cooperating opening and closing mechanism secured to each corner member at the upper portion of the structure, whereby said container will have said panels separated at the upper portion of said structure during raising thereof and will have said members closed during lowering of said container at the same position.

3. The subject matter of claim 2, in which said container corner closure and separating means constitutes a slide fastening closure at each end and a slide fastener secured at an upper position at each corner member in cooperating relation therewith.

4. A cart for transporting and dispensing shiftable articles such as soiled clothing and the like comprising, a generally rectangular frame structure having upstanding corner members, a first pair of elongated sheet-engaging members, interposed across the upstanding corner members, one at each side of said cart, a second pair of elongated sheet-engaging members disposed one each at the forward and rearward end of said cart and substantially in the same horizontal level as those interposed across the corner members at the respective sides, a third pair of elongated sheet-engaging members, one each interposed in spaced parallel relation and at a lower position with respect to the sheet-engaging members disposed at the respective ends of said cart, a movable rectangular bottom adapted to be raised vertically in medial relation with said corner members, a pair of sheets secured around the spaced sheet-engaging members, one each at the respective ends of said cart, each of said pair of sheets at the ends of said cart being secured edgewise to the ends of said bottom, a pair of flexible sheets, one each at the sides of said cart secured at their lower edges to the respective sides of said bottom and carried at an upper position on their associated sheet-engaging members, each of said flexible sheets having a side edge adjoining that of another and together defining a clothes-retaining container, and raising and lowering means mounted on said frame structure and connecting with said pairs of flexible sheets for raising and lowering thereof with the end sheets operating in an endless belt arrangement to raise simultaneously and vertically with said bottom and the side flexible sheets likewise being raised in a vertical direction at the same rate as the end sheets.

5. The subject matter of claim 4, and a continuous closure for securing the adjoining side edges in a closed corner for said container, and a cooperating element secured to each of said uprights on said frame for releasing said side edges adjacent the upper sheet-engaging members whereby to permit each of said flexible sheets to become separated on raising of the container and to unite on lowering said container.

References Cited in the file of this patent

UNITED STATES PATENTS

| 813,059 | Praed | Feb. 20, 1906 |
| 2,449,395 | Lakso | Sept. 14, 1948 |
| 2,483,582 | Hill | Oct. 4, 1949 |